(12) United States Patent  (10) Patent No.: US 7,440,608 B2
Silverstein  (45) Date of Patent: Oct. 21, 2008

(54) METHOD AND SYSTEM FOR DETECTING IMAGE DEFECTS

(75) Inventor: D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 548 days.

(21) Appl. No.: 11/139,665

(22) Filed: May 31, 2005

(65) Prior Publication Data

US 2006/0268345 A1 Nov. 30, 2006

(51) Int. Cl.
*G06K 9/00* (2006.01)
*G06K 9/68* (2006.01)
*H04N 7/18* (2006.01)
*H04N 9/47* (2006.01)

(52) U.S. Cl. .......... 382/149; 382/221; 348/125
(58) Field of Classification Search ......... 382/181, 382/190, 195, 203, 217, 218, 221, 275, 282, 382/283, 149; 348/86, 92, 95, 125; 358/482
See application file for complete search history.

(56) References Cited

U.S. PATENT DOCUMENTS

| | | | |
|---|---|---|---|
| 5,063,603 A | 11/1991 | Burt | |
| 5,436,979 A | 7/1995 | Gray et al. | |
| 5,446,501 A | 8/1995 | Takemoto et al. | |
| 5,621,811 A * | 4/1997 | Roder et al. | 382/147 |
| 5,694,487 A | 12/1997 | Lee | |
| 6,035,072 A | 3/2000 | Read | |
| 6,125,213 A | 9/2000 | Morimoto | |
| 6,233,364 B1 | 5/2001 | Krainiouk et al. | |
| 6,266,054 B1 | 7/2001 | Lawton et al. | |
| 6,578,017 B1 | 6/2003 | Ebersole et al. | |
| 6,583,823 B1 | 6/2003 | Shimada et al. | |
| 6,792,161 B1 | 9/2004 | Imaizumi et al. | |
| 6,794,608 B2 | 9/2004 | Flood et al. | |
| 7,012,642 B1 | 3/2006 | Zell | |

(Continued)

FOREIGN PATENT DOCUMENTS

EP 0666695 8/1995

(Continued)

OTHER PUBLICATIONS

Schallauer P et al - "Automatic Restoration Algorithms for 35MM Film" - Journal of Computer Vision Research vol. 1 No. 3 - 1999 pp. 60-85.

(Continued)

*Primary Examiner*—Yon Couso

(57) ABSTRACT

An exemplary method includes identifying defects in a first image among a series of images, by identifying a first portion of the first image at a first location in the first image, wherein a brightness of the first portion is different from a second portion at the first location in a previous image and a third portion at the first location in a subsequent image, by an amount exceeding a first threshold value, determining whether a first region of the first image that includes the first portion, matches a second region of the previous image and a third region of the subsequent image, wherein the second and third regions are at second and third locations displaced from the first location, and characterizing the first portion as a defect when the first region does not match the second and third regions.

20 Claims, 4 Drawing Sheets

U.S. PATENT DOCUMENTS

| | | |
|---|---|---|
| 7,085,673 B2 * | 8/2006 | Picciotto et al. .............. 702/158 |
| 7,171,038 B2 * | 1/2007 | Adler et al. .................. 382/149 |
| 7,200,257 B2 * | 4/2007 | Rankin et al. ................ 382/144 |
| 2002/0037099 A1 * | 3/2002 | Ogawa et al. ................ 382/149 |
| 2002/0071613 A1 | 6/2002 | Ford et al. |
| 2006/0114358 A1 | 6/2006 | Silverstein et al. |
| 2006/0115178 A1 | 6/2006 | Fan et al. |
| 2006/0210191 A1 | 9/2006 | Silverstein et al. |

FOREIGN PATENT DOCUMENTS

| | | |
|---|---|---|
| GB | 2356514 | 5/2001 |
| JP | 2003023572 | 1/2003 |

OTHER PUBLICATIONS

Joyeux L et al - "Reconstruction of Degraded Image Sequence. Application to Film Restoration" - Image and Vision Computing - vol. 19 2001 - pp. 503-516

Sonka M et al - "Passage" - Image Processing, Analysis and Machine Vision - 1999 pp. 134-135 & 174-175.

HS Digital Service - "Noise/Grain Reduction - Scratch/Dust Removal"- Jun. 7, 2004 pp. 1-2.

Kuiper A - "Detection of Dirt Blotches on Optical Sound Tracks Using Digital Image Processing" RadioElectronkia 2005 - pp. 120-123.

\* cited by examiner

202 — IDENTIFY A FIRST PORTION OF A FIRST IMAGE AMONG A SERIES OF IMAGES AT A FIRST LOCATION IN THE FIRST IMAGE, WHEREIN A BRIGHTNESS OF THE FIRST PORTION IS DIFFERENT FROM A SECOND PORTION AT THE FIRST LOCATION IN A PREVIOUS IMAGE AND A THIRD PORTION AT THE FIRST LOCATION IN A SUBSEQUENT IMAGE, EACH BY AN AMOUNT EXCEEDING A FIRST THRESHOLD VALUE

204 — DETERMINE WHETHER A FIRST REGION OF THE FIRST IMAGE THAT INCLUDES THE FIRST PORTION, MATCHES A SECOND REGION OF THE PREVIOUS IMAGE AND A THIRD REGION OF THE SUBSEQUENT IMAGE, WHEREIN THE SECOND AND THIRD REGIONS ARE AT SECOND AND THIRD LOCATIONS DISPLACED FROM THE FIRST LOCATION

206 — CHARACTERIZE THE FIRST PORTION AS A DEFECT WHEN THE FIRST REGION DOES NOT MATCH THE SECOND AND THIRD REGIONS

FIGURE 2

METHOD AND SYSTEM FOR DETECTING IMAGE DEFECTS

BACKGROUND INFORMATION

Artifacts or defects in a time-series of images such as a motion picture film can be manually identified and removed. Example artifacts include localized thermal damage resulting from holding a frame in front of a projector bulb for an excessive time, chemical damage or degradation of the film, dust specks, scratches, and so forth. An automatic or semi-automatic technique for selecting and optionally correcting artifacts would be desirable.

SUMMARY

An exemplary method includes identifying defects in a first image among a series of images, by identifying a first portion of the first image at a first location in the first image, wherein a brightness of the first portion is different from a second portion at the first location in a previous image and a third portion at the first location in a subsequent image, by an amount exceeding a first threshold value, determining whether a first region of the first image that includes the first portion, matches a second region of the previous image and a third region of the subsequent image, wherein the second and third regions are at second and third locations displaced from the first location, and characterizing the first portion as a defect when the first region does not match the second and third regions.

An exemplary system for identifying defects in a first image among a series of images includes a memory for storing the series of images, and a processor for identifying a first portion of the first image at a first location in the first image, wherein a brightness of the first portion is different from a second portion at the first location in a previous image and a third portion at the first location in a subsequent image, by an amount exceeding a first threshold value, determining whether a first region of the first image that includes the first portion, matches a second region of the previous image and a third region of the subsequent image, wherein the second and third regions are at second and third locations displaced from the first location, and characterizing the first portion as a defect when the first region does not match the second and third regions.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements

FIG. 2 shows a flowchart of an exemplary embodiment.

DETAILED DESCRIPTION

In an exemplary embodiment, a consecutive series of image frames are analyzed to discern defects in one of the frames, for example to identify an anomaly that is present in a first location in a middle frame but not present at the first location in previous or subsequent frames. Further analysis can be performed to determine whether the anomaly is a true defect or is caused by a moving object that is part of a scene captured in the image frames, for example when an object moves within the scene and/or the entire scene moves across one or more of the image frames, as when a camera is panned or zoomed.

In particular, FIG. 2 shows a flowchart of an exemplary embodiment, which can also be explained with respect to FIG. 1 which shows exemplary image frames, objects and artifacts and operations consistent with exemplary embodiments described herein.

Figure 1A:
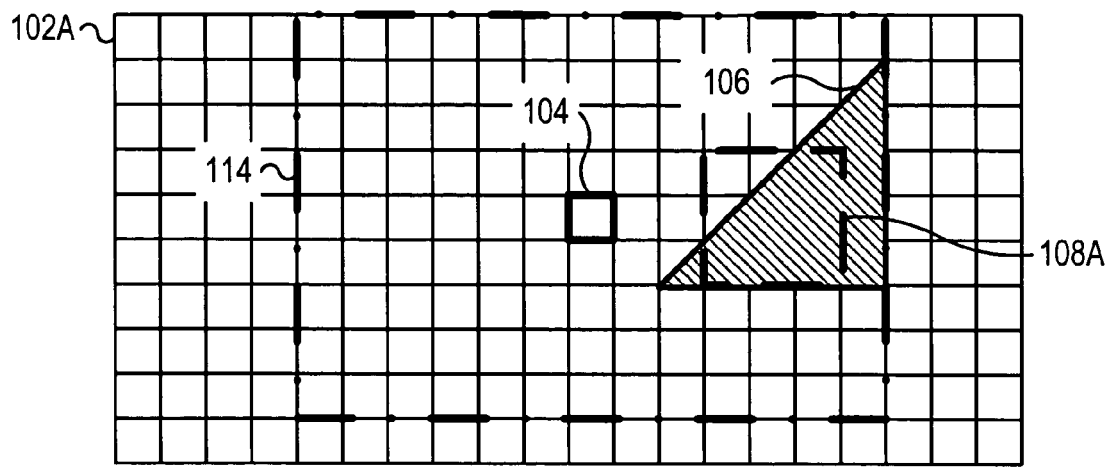
FIGS. 1A-C illustrate an exemplary embodiment where defects and objects are identified in successive image frames.
Figure 1B:
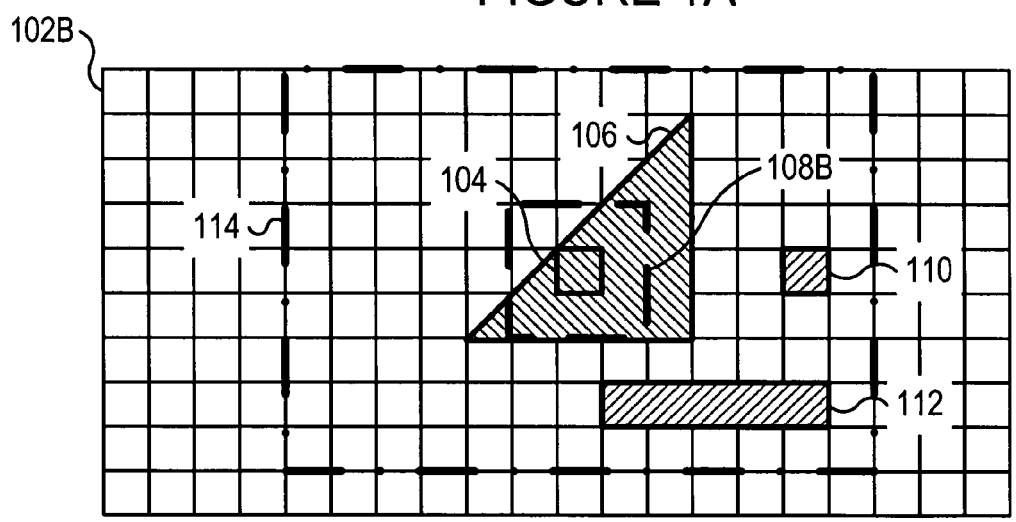
Figure 1C:
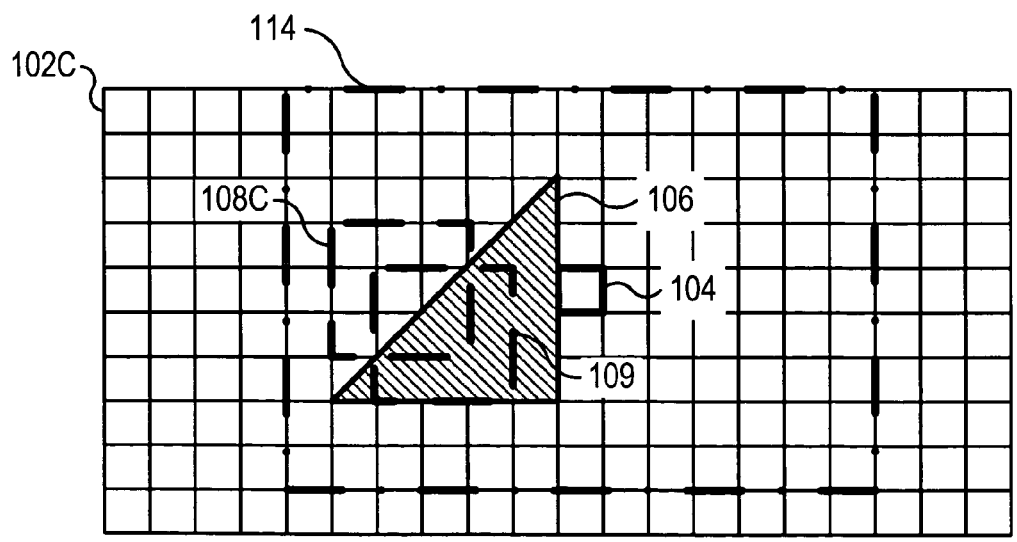

In a first block 202 of FIG. 2, a first portion of a first image among a series of images at a first location in the first image is identified, wherein a brightness of the first portion is different from a second portion at the first location in a previous image and a third portion at the first location in a subsequent image, by an amount exceeding a first threshold value. For example, FIGS. 1A-C show a series of image frames 102A, 102B, 102C, where for example the image frames are consecutive in time and image frame 102B is the frame being analyzed for defects, frame 102A is a previous frame, and frame 102C is a subsequent frame. In accordance with an exemplary embodiment, an anomaly at one location that is present in only one frame can be considered to be a defect. A first portion, such as the image data at first location 104 and the element 112, has a different brightness in frames 102A and 102C than in frame 102B, and can therefore be identified as a possible defect or artifact. The element 110 can also be identified as a possible defect, since it is not present in frame 102C and the corresponding area/location in frame 102A is covered with a different shape having a different size, and also a different brightness (as indicated by the different hatching). The threshold value can be for example a percentage difference of a possible brightness range, for example 1%. The threshold value can be between 1% and 10%, less than 1%, greater than 10%, or any desired absolute or relative value. For example, where brightness is represented with 16 bit data, 65,536 values are possible, and in that range an exemplary brightness delta or difference threshold can be 500.

From block 202, control moves to block 204 where a determination is made whether a first region of the first image that includes the first portion, for example a region 108B shown in FIG. 1B, matches a second region 108A of the previous image and a third region 108C of the subsequent image, wherein the second and third regions are at second and third locations displaced from the first location, for example the first location 104 as shown in FIGS. 1A and 1C. As shown in FIGS. 1A-C, a scene object 106 moves through the image frames 102A, 102B, 102C, and in fact accelerates as evidenced by the displacement/movement track of the object 106. The contents of the regions 108A, 108B, 108C match sufficiently to conclude that the anomaly at the first location 104 is due to a moving scene object 106, rather than a defect. With respect to all of the embodiments and methods described herein, average brightness values of the regions can be squared and then compared using mean square error techniques or metrics to indicate or determine whether a match exists and/or generate a comparison measure indicating a degree of matching or similarity between regions. Other comparison techniques including other statistical techniques can be used to determine presence or absence of a match between regions, and/or generate a measure indicating a degree of matching or similarity. In one embodiment, acceleration can be accounted for by using region 109 for matching determination instead of region 108C. In this case, the match may be closer. With respect to element 112, comparison can be performed according to block 204. For example, a region centered on the element 112 in the image frame 102B can be compared with regions in the image frames 102A, 102C that are located at or near the same location, and the comparison will reveal no match and hence would be properly characterized as a defect.

Element 110 is slightly different in that the corresponding locations in frames 102A, 102C have different brightness than element 110, but also have different brightness from each other. For example when block 204 is performed with respect to element 110, the element 110 can be presumed to be a defect, and region matching will reveal no moving scene object corresponding to the element 110 and thus (in block 206) the element 110 will be confirmed as a defect. For example, no moving scene object in the image frame series 102A, 102B, 102C has the same size and brightness as the element 110. In addition or alternatively, element 110 can be flagged or otherwise marked or announced to draw the attention of a human operator to it, and input or confirmation regarding status or characterization of the element 110 can be requested or received from the user.

From block 204, control proceeds to block 206, wherein the first portion (e.g. the element 110 or the element 112) is characterized as a defect when the first region does not match the second and third regions as determined for example in block 204.

Figure 3:
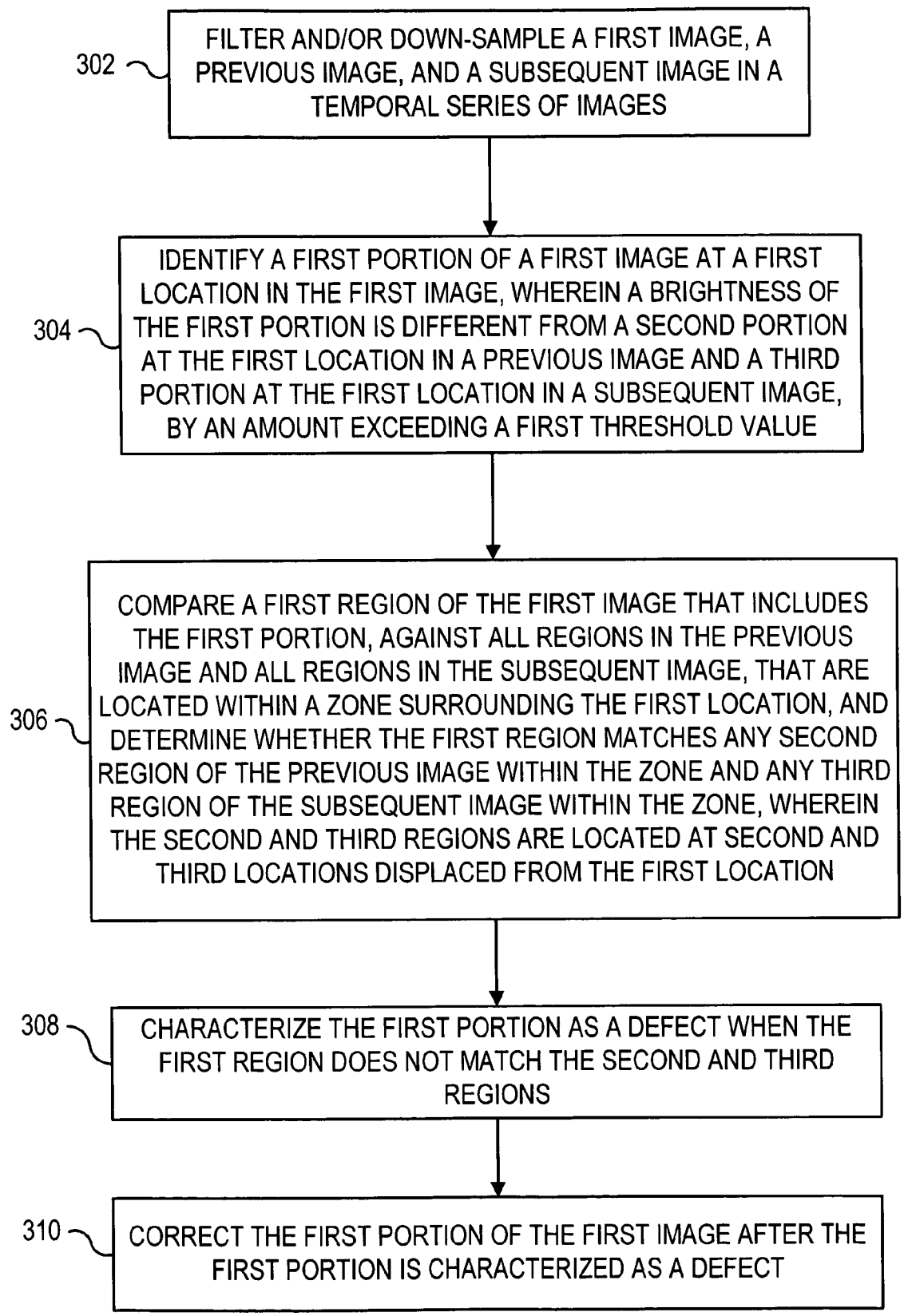
FIG. 3 shows a flowchart of an exemplary embodiment.

FIG. 3 illustrates an exemplary embodiment with greater detail, which can be described with reference to FIGS. 1A-C. In a first block 302, a first image such as the image frame 102B, a previous image such as the image frame 102A, and a subsequent image such as the image frame 102C in a temporal series of images are filtered and/or down-sampled. The filtering can be noise filtering, for example grain filtering (e.g., by low-pass filtering), median filtering, or any other filtering. Median filtering can be performed for each pixel by taking the median value (e.g. color value, brightness value, etc.) of its neighbors and then assigning that median value to the pixel.

From block 302, control proceeds to block 304, wherein a first portion of the first image at a first location in the first image is identified, wherein a brightness of the first portion is different from a second portion at the first location in a previous image and a third portion at the first location in a subsequent image, by an amount exceeding a first threshold value. The first portion can be, for example, the image data at first location 104 in frame 102B, the element 110 or the element 112, as described with respect to FIGS. 1-2. The first portion can be a single pixel, or can be a group of pixels.

From block 304, control proceeds to block 306, wherein a first region of the first image that includes the first portion, is compared against all similarly sized and shaped regions in the previous image and all regions in the subsequent image, that are located within a zone surrounding the first location. Regions can be any desired shape or size. FIGS. 1A-C illustrate an example zone 114 centered with respect to the first location 104, and example regions 108A, 108B, 108C, and 109. For example, in FIG. 1A the region 108A can be moved one grid or pixel at a time in each direction within the zone 114, so that a region in a frame that is selected for comparison, can overlap with a subsequent or prior region in the frame that is selected for comparison with a region in a different image frame. In an exemplary embodiment, the regions selected within a region for comparison with regions in other image frames, do not overlap. The regions can be for example 7×7 pixels square, or can be any other shape and/or size. In an exemplary embodiment, zones in the previous and subsequent images are displaced by equal or similar amounts in opposite directions with respect to the first location, as part of the comparison process. One rationale for this technique is an assumption that objects moving through an image scene over or across the first location will have a constant or nearly constant velocity, which can reduce the computational burden or complexity of the comparison process. The size, shape or radius of the zone can be selected automatically or by a user, based for example on an expected maximum velocity of any object moving through the image scene.

Also in block 306, a determination is made as part of the comparison, whether the first region of the first image that includes the first portion, matches any second region of the previous image within the zone and any third region of the subsequent image within the zone, wherein the second and third regions are located at second and third locations displaced from the first location. For example, whether the region 108B shown at its location in image frame 102B matches any similarly-sized regions at any locations within the zone 114 in the image frames 102A, 102C, for example the regions 108A, 108C or 109. In an exemplary embodiment, second and third regions having constant and opposite linear displacement with respect to the first portion (e.g., through the first location) are evaluated, and if an average or marginal match is found, then additional regions within a radius or tolerance value distance of the matching second and third regions can be compared to determine whether a better match can be found. In this way, acceleration of a scene object through the image scene can be accounted for. For example, the regions 108A and 108C are displaced by the same amount in opposite directions with respect to the location of a first portion in the first frame, e.g., the first location 104, resulting in a good match between the regions 108A and 108B. However, there is a less optimal match between the region 108C and either the region 108A or the region 108B. Searching further within a radius of the region 108C yields the region 109, which is a better match to the regions 108A, 108B than the region 108C.

The magnitude of the search radius can correspond to a maximum expected or acceptable acceleration of the scene object, and can be any appropriate value. For example, if no acceleration is to be tolerated or investigated, then the search radius would be zero. The magnitude of the search radius and also the size of the zone (e.g., the zone 114) can for example be set or adjusted by a user or human operator, and/or can be set automatically based on such factors as size of a suspected scene object, image content, and so forth. For example, image content such as a high speed car race can merit expected speeds and accelerations and thus larger zone size and search radii, whereas slower motion activity could merit smaller zone size and search radii. Other factors such as focal length of a camera used to originally capture the image scenes, and mounting or carriage of the camera (e.g., mounted in a machine rest or hand held) can influence selection of the search radius and other parameters mentioned herein.

The criteria for performing an additional radius search around a zone in the previous or subsequent image frame, can be triggered for example when matches between regions displaced by the same amount in opposite directions with respect to the first portion or first location, lie within a quality band that is above a first degree of similarity or threshold of matching, and below a second degree of similarity or threshold of matching. In other words, an additional radius search can be triggered when the degree or measure of matching or correlation is good enough to suggest that a match is likely, but poor enough to suspect acceleration and/or merit looking further.

From block 306, control proceeds to block 308, where the first portion is characterized as a defect if the result of the comparison and determination in block 306 is that the first region does not match the second and third regions. For example, the image data at first location 104 in image frame 102B would not be characterized as a defect, whereas the elements 112, 110 would be characterized as defects.

From block 308 control proceeds to block 310. If the first portion was characterized as a defect in block 308, then in block 310 the first portion is corrected. The correction can be done, for example, by replacing the first portion in the first image frame with content from the same location in either the previous or subsequent image frame. Alternatively, the first portion in the first image frame can be interpolated, for example by linear interpolation. In an exemplary linear interpolation algorithm, values (e.g. brightness or color values) of neighboring pixels above and below the first portion are averaged to form a vertical average, neighboring pixels on both sides of the first portion are averaged to form a horizontal average, and then the vertical and horizontal averages are averaged together and the resulting value is assigned to the pixel or pixels within the first portion. Other interpolation or correction schemes or techniques can also be used.

The process described above with respect to FIG. 3 can be performed for each first portion or candidate defect or artifact in the first image, for example simultaneously or sequentially, and zones can be sized and located according to the location and/or size or character of the first portion. In addition, the processes described herein can be repetitively applied to the same sequence of image frames, so that a given image frame is analyzed and corrected in multiple passes. Different parameters, for example different threshold values, can be used at each pass. In an exemplary embodiment, one or more initial passes are executed with conservative parameters, and then a subsequent pass is performed semi-automatically with more aggressive parameters and supervision or input by a human operator or a supervisory program. During semiautomatic operation, characterized defects can be flagged prior to correction so that the characterization can be reviewed, and then confirmed or changed by the human operator or supervisory program prior to any correction.

The size of the comparison regions can be selected to be small enough so that each region may contain only one moving object, but large enough to match with some degree of exclusivity or uniqueness with other regions in the other image frames. Size of the comparison regions can also help locate accelerated scene objects, for example, a larger size can, in essence, cast a larger net. Region size and magnitude of iterative displacement, e.g., the amount a region is displaced at each step during the comparison process (e.g., block 306) such as by a single pixel or some other fraction of the region size up to and including one or unity, can also be changed for successive or iterative passes over an image frame, for example starting large and then decreasing. In an exemplary embodiment, the procedures described herein of identifying and confirming image defects can be first applied to down-sampled images, and then the results can be refined by applying the procedures to the original or up-sampled images. For example, the procedures can be selectively applied to specific areas of the up-sampled or original images where defects were identified in those areas in the down-sampled images. Regions can be smaller than the defects, or in other words defects can be identified and corrected piecemeal.

Linear and accelerated searches can also be performed on down-sampled and original or up-sampled images respectively. For example, a multiple resolution motion match can be performed, wherein a low resolution, large area region match is found with zero acceleration. The offset or displacement for the region in the previous and subsequent image frames is set to be equal and opposite. Then, a high-resolution small area region match is found, where the area searched for the match is offset from the large area or coarse region match by an amount corresponding to a maximum allowed acceleration. Thereafter, motion matching is completed as variously described herein, for example by comparing the first region in the first or middle image frame to the matched regions in the previous and subsequent image frames, to discern whether the first region is more than a threshold darker or lighter than the matched regions in the previous and subsequent image frames and is therefore a defect.

Any time prior to correction, defects or image frame elements identified as/believed to be defects, can be analyzed (or further analyzed) to determine if they are in fact defects or are instead part of the image scene. This analysis can, for example, be performed at any time prior to irreversible correction of an element in question. Repetitive patterns of image frame elements identified as defects, in particular closely clustered elements that form clumps that are larger than a first threshold or smaller than another threshold less than the first threshold, can indicate that the elements are in fact part of the image scene, for example a repetitive texture. For example, randomness can suggest a defect, and order can suggest a legitimate feature of the image scene. In addition, a shape of an element identified as a defect can be used to determine whether the element is in fact a defect. Dust, scratches and lint can have typical shapes, and shape recognition of the image frame elements and matching of the recognized shapes against typical defect shapes can be used to confirm whether an element is a defect, or can be used to otherwise weight or influence the determination process. Scratches can be long, narrow lines of pixels. A relatively small and isolated pixel clump, or a contiguous group of image frame elements that is not near other groups, can be identified as dust. An image frame element or object that is both long and thick can be identified as an object or part of an object that properly belongs to the image scene, for example a boundary or occlusion, and thus be ruled out as a defect. Thus if an image frame element or artifact is identified as a potential defect and then a shape of the element or artifact is recognized as matching a typical defect shape and/or size, then the element can be characterized as or determined to be a defect. Morphological dilation can also be used to expand groups or clusters of image frame elements believed to be defects, to include or identify the faint edge of a dust area. Clumps of image frame elements that are denser than an upper threshold or less dense than a lower threshold, can be ruled out as defects. Different films or media being analyzed and corrected can have different kinds or manifestations of defects, and thus a human operator can look at sample images of the film or image media and select parameters that are appropriate for that particular example and thereafter initiate automatic analysis and/or correction using those parameters.

Elements of the techniques described herein can be applied adaptively. For example, the size of the search zone, e.g., the zone 114, can be adaptively adjusted. For example, if motion-matched regions are being found near the outer edges of the zone, the zone can be enlarged. If motion-matched regions are mostly being found near the center of the zone, then the zone can be reduced. In an exemplary embodiment, the zone is adaptively sized so that a radius from a center of the zone to an outer edge of the zone is five times the average radius at which motion-matched regions are being found.

The techniques and embodiments described herein can be applied to motion picture films, including color motion picture films, and in particular to black-and-white motion picture films. The subject media can be analog or digital in form, can be analog converted to digital form, or any appropriate form or image medium.

In an exemplary embodiment, a user can indicate specific areas of image frames that are to be automatically processed in accordance with the techniques described herein, and can indicate areas that are to be left alone. The user can also specify that the system should automatically identify all potential defects are to be automatically identified, but confirmation of all the identifications or characterizations should be sought from the user before proceeding, or sought for those potential defects that fall below a quantitative, qualitative, or statistical threshold and automatically correct the other identified defects. In an exemplary embodiment, the system can operate adaptively, for example by learning from the user's input with respect to uncertain defects, or by statistical analysis.

Figure 4:
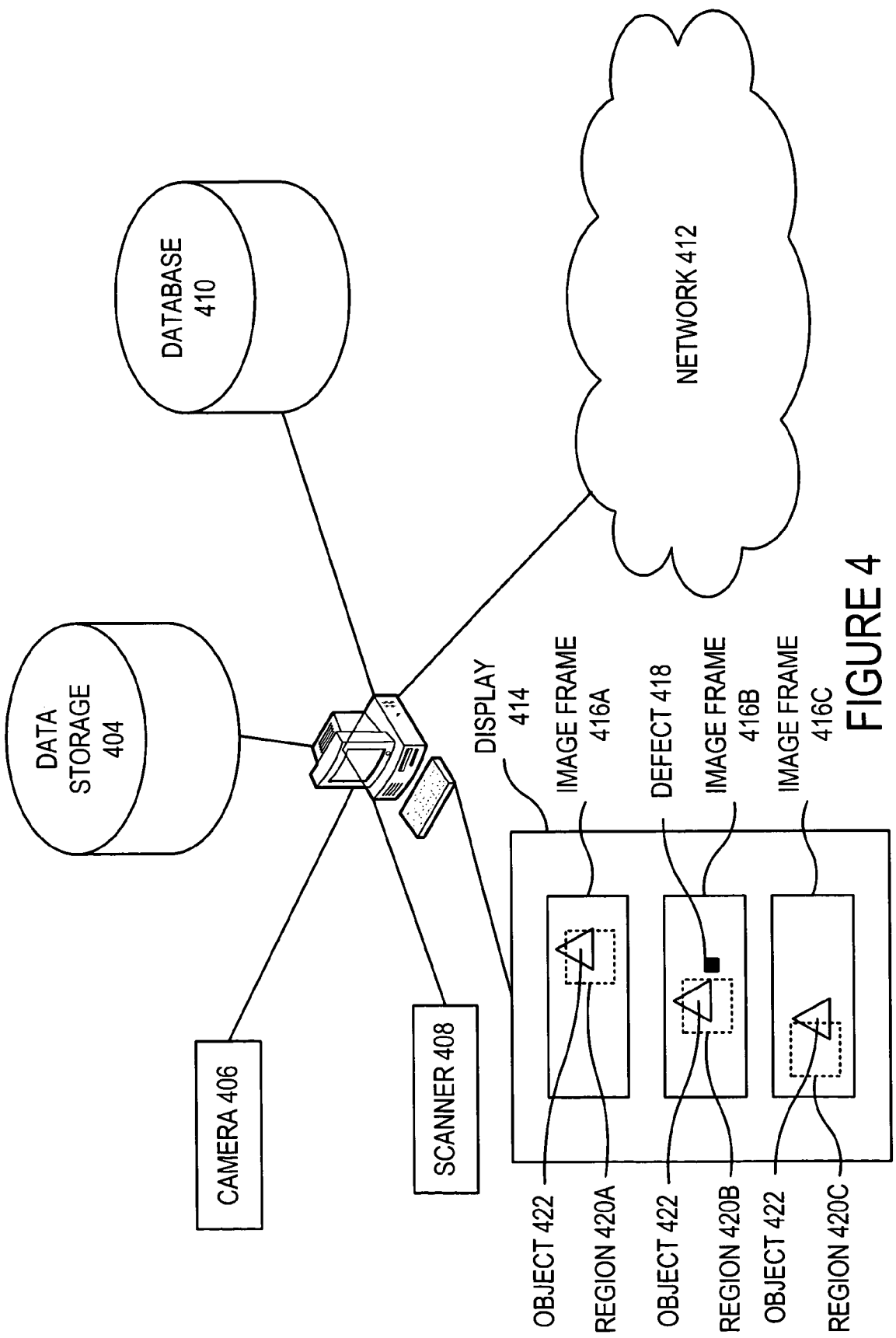
FIG. 4 illustrates an exemplary embodiment of a system.

FIG. 4 illustrates an exemplary system that can be used to variously implement the methods and procedures described herein. In particular, FIG. 4 illustrates a computer 402 is connected variously to a network 412, a database 410, data storage facility 404 (e.g., a hard disk drive), a camera 406, and a scanner 408. For example, a memory of the computer 402 and/or the data storage 404, and database 410 can store the image frames, and a processor of the computer 402 can identify candidate defects and compare regions among the image frames to detect whether a candidate defect is in fact an image object traversing the image frame or some other legitimate image scene feature, as described in greater specificity with respect to FIGS. 1-3. The display 414 can display the initial, interim and final analysis results, and as shown in FIG. 4 can display image frames containing moving scene objects, a middle image frame containing a defect, and exemplary regions for comparison. For example, defect 418, and scene object 422 are shown with respect to image frames 416A, 416B, 416C and regions 420A, 420B, 420C, in the display 414. Also shown in FIG. 4 are an interface, such as a keyboard of the computer 402 or any other interface (e.g. the camera 406, scanner 408, a device of the computer 402 for receiving data storage media such as a removable flash card or key, floppy disk, CD (Compact Disk) drive, etc.), that can receive input from a user. The computer 402 can receive images or image frames from any of the elements 404-412 for analysis. Software implementing the methods of FIGS. 1 and 2 can be run in part or in whole, on the computer 402. A user can respond to prompts, input selections, and view interim and final results of the method (including for example the elements shown in FIG. 4), for example via the display 414. Via one or more user interfaces of the computer 402, for example, a keyboard, mouse and display screen, the user can also provide information to the computer 402 and/or make selections. For example, the user can provide or select images to be processed, via any peripheral devices or data ports of the computer 402, including for example, cable connections or data ports and data storage media such as floppy disks or optical disks to internal floppy or optical drives of the computer 402.

Software packages, elements or modules for variously providing the functions described herein, can be implemented on a computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein. The term "comprising" as used herein is open-ended and not exclusive.

The invention claimed is:

1. A method for identifying defects in a first image among a series of images, comprising:
   identifying a first portion of the first image at a first location in the first image, wherein a brightness of the first portion is different from a second portion at the first location in a previous image and a third portion at the first location in a subsequent image, by an amount exceeding a first threshold value;
   determining whether a first region of the first image that includes the first portion, matches a second region of the previous image and a third region of the subsequent image, wherein the second and third regions are at second and third locations displaced from the first location; and
   characterizing the first portion as a defect when the first region does not match the second and third regions.

2. The method of claim 1, wherein the first portion is a single pixel.

3. The method of claim 1, comprising down-sampling the first, previous and subsequent images prior to the identifying.

4. The method of claim 1, wherein the second and third locations are displaced from the first location in different directions.

5. The method of claim 4, wherein the second and third locations are displaced from the first location to within a first tolerance of a first distance.

6. The method of claim 5, wherein the second and third locations are displaced from the first location in opposite directions.

7. The method of claim 1, wherein the second and third regions match the first region when a degree of similarity between the first region and each of the second and third regions exceeds a second threshold value.

8. The method of claim 1, comprising correcting the first portion of the first image after the first portion is characterized as a defect.

9. The method of claim 6, wherein the first portion is corrected by substituting at least one of the second and third portions for the first portion in the first image.

10. The method of claim 1, wherein the regions are larger than the portions.

11. The method of claim 1, wherein the determining comprises comparing the first region of the first image that includes the first portion, against all regions in the previous image and all regions in the subsequent image, that are within a zone surrounding the first location.

12. A machine readable medium comprising a computer program for causing a computer to perform:
   identifying a first portion of a first image among a series of images at a first location in the first image, wherein a brightness of the first portion is different from a second portion at the first location in a previous image and a third portion at the first location in a subsequent image, by an amount exceeding a first threshold value;
   determining whether a first region of the first image that includes the first portion, matches a second region of the previous image and a third region of the subsequent image, wherein the second and third regions are at second and third locations displaced from the first location; and
   characterizing the first portion as a defect when the first region does not match the second and third regions.

13. The medium of claim 12, wherein the program causes the computer to perform down-sampling the first, previous and subsequent images prior to the identifying.

14. The medium of claim 12, wherein the second and third locations are displaced from the first location in different directions.

15. The medium of claim 14, wherein the second and third locations are displaced from the first location to within a first tolerance of a first distance, and wherein the second and third locations are displaced from the first location in opposite directions.

16. The medium of claim 12, wherein the second and third regions match the first region when a comparison measure between the first region and each of the second and third regions exceeds a second threshold value.

17. The medium of claim 12, wherein the program causes the computer to correct the first portion of the first image after the first portion is characterized as a defect.

18. The medium of claim 1, wherein the program causes the computer to compare the first region of the first image that includes the first portion, against all regions in the previous image and all regions in the subsequent image, that are within a zone surrounding the first location.

19. A system for identifying defects in a first image among a series of images, comprising:
   a memory for storing the series of images;
   and a processor for identifying a first portion of the first image at a first location in the first image, wherein a brightness of the first portion is different from a second portion at the first location in a previous image and a third portion at the first location in a subsequent image, by an amount exceeding a first threshold value, determining whether a first region of the first image that includes the first portion, matches a second region of the previous image and a third region of the subsequent image, wherein the second and third regions are at second and third locations displaced from the first location, and characterizing the first portion as a defect when the first region does not match the second and third regions.

20. The system of claim 19, wherein the processor down-samples the first, previous and subsequent images prior to the identifying, and wherein the second and third locations are displaced from the first location in opposite directions to within a first tolerance of a first distance.

* * * * *